United States Patent [19]

Landerman et al.

[11] Patent Number: 4,464,908
[45] Date of Patent: Aug. 14, 1984

[54] SOLAR-POWERED TURBOCOMPRESSOR HEAT PUMP SYSTEM

[75] Inventors: Abraham M. Landerman, Storrs; Frank R. Biancardi, South Windsor, both of Conn.; Gorken Melikian, Springfield, Mass.; Maurice D. Meader, Avon, Conn.; Charles E. Kepler, East Hartford, Conn.; Torger J. Anderson, Manchester, Conn.; James W. Sitler, Westfield, Mass.

[73] Assignee: The United States of America as represented by the United States Department of Energy, Washington, D.C.

[21] Appl. No.: 407,539

[22] Filed: Aug. 12, 1982

[51] Int. Cl.$^3$ .................................................. F25B 27/00
[52] U.S. Cl. .................................. 62/235.1; 62/238.4; 62/501
[58] Field of Search .............. 62/235.1, 238.4, 468, 62/501, 222; 60/643, 641.15, 657, 670

[56] References Cited

U.S. PATENT DOCUMENTS

| | | | |
|---|---|---|---|
| 1,106,287 | 8/1914 | Doelling | 62/222 X |
| 3,153,442 | 10/1964 | Silvern | 62/238.4 X |
| 3,276,226 | 10/1966 | Osborne | 62/501 X |
| 3,277,658 | 10/1966 | Leonard, Jr. | 62/87 |
| 3,381,491 | 5/1968 | Harnish | 62/222 X |
| 4,005,580 | 2/1977 | Swearingen | 60/657 |
| 4,055,964 | 11/1977 | Swenson et al. | 62/238.4 |
| 4,103,493 | 8/1978 | Schoenfelder | 60/641 |
| 4,261,176 | 4/1981 | Theyse | 62/235.1 |
| 4,265,220 | 5/1981 | McAlister | 62/235.1 X |
| 4,271,679 | 6/1981 | Schafer | 62/238.4 |
| 4,280,328 | 7/1981 | Falconer | 60/641 |
| 4,342,201 | 8/1982 | Ishii | 62/238.4 |

Primary Examiner—Lloyd L. King
Attorney, Agent, or Firm—L. E. Carnahan; Roger S. Gaither; Michael F. Esposito

[57] ABSTRACT

The turbocompressor comprises a power turbine (14) and a compressor turbine (16) having respective rotors (18) and (20) on a common shaft (22), rotatably supported by bearings (26) and (28). A first working fluid is supplied by a power loop (32) and is expanded in the turbine (14). A second working fluid is compressed in the turbine (16) and is circulated in a heat pump loop (70). A lubricant is mixed with the second working fluid but is excluded from the first working fluid. Bearings (26) and (28) are cooled and lubricated by a system which circulates the second working fluid and the intermixed lubricant through the bearings (26) and (28). Such system includes a pump (126), a thermostatic expansion valve (150) for expanding the working fluid into the space (152) between the bearings (26) and (28), and a return conduit system (154, 156, 158) for withdrawing the expanded working fluid after it passes through the bearings and for returning the working fluid to the evaporator (82). A shaft seal (30) excludes the lubricant from the power turbine (14). The power loop (32) includes a float (208) operable by liquid working fluid in the condenser (46) for controlling a recirculation valve (206) so as to maintain a minimum liquid level in the condenser, while causing a feed pump (48) to pump most of the working fluid into the vapor generator (34). The heat pump compressor loop (70) includes a float (222) in the condenser (78) for operating an expansion valve (88) to maintain a minimum liquid working fluid level in the condenser (78) while causing most of the working fluid to be expanded into the evaporator (82).

30 Claims, 4 Drawing Figures

SOLAR-POWERED TURBOCOMPRESSOR HEAT PUMP SYSTEM

BACKGROUND OF THE INVENTION

This invention relates to a heat pump system which preferably is solar-powered, at least in part, and preferably utilizes a power turbine which drives a compressor turbine. The power turbine preferably employs a Rankine power cycle, in which a working fluid is vaporized in a vapor generator by solar heat and, if necessary, additional heat from a furnace or some other auxiliary heat source, to produce hot vapor which is expanded in the power turbine to drive the turbine. The expanded vapor is then liquefied in a condenser to produce liquid working fluid which is returned in a closed loop to the vapor generator, where it is again vaporized by solar heat or auxiliary heat.

The compressor turbine preferably compresses a low pressure vapor of a working fluid. The compressed vapor is liquefied in a condenser, from which the liquid working fluid is supplied in a closed loop to an evaporator where the fluid is vaporized to produce refrigeration. The low pressure vapor is returned to the compressor turbine. When the heat pump system is utilized in a cooling mode, the refrigeration produced in the evaporator is employed to cool a building or the like. A heat exchange liquid is circulated through a heat exchange coil in the evaporator and is also circulated through a heat exchange system in the building to cool the building. In the cooling mode, the condensers in the power system and the heat pump system are cooled by a heat exchange system which may discharge heat to the atmosphere, the earth or otherwise.

The heat pump system may also be operated in a heating mode, in which the heat from the condensers is employed to heat a building or the like, by means of a heat exchange system in which a heat exchange fluid is circulated through the condensers and also through a heat exchanger in the building. In this mode low temperature heat from solar or other sources is employed by means of heat exchangers to provide heat input to the evaporator.

The power turbine and the compressor turbine are preferably combined in a turbocompressor having a common rotary shaft.

OBJECTS OF THE INVENTION

One object of the present invention is to provide a turbocompressor heat pump system, including new and improved means for lubricating and cooling the bearings which support the rotary shaft of the turbocompressor.

A further object is to provide a turbocompressor heat pump system, in which the same basic working fluid is employed in the power turbine and the compressor turbine, but in which the working fluid for the power turbine is kept free of any lubricant, while a lubricant is introduced into the working fluid for the compressor turbine, and such working fluid is employed in a new and improved system for lubricating and cooling the bearings for the rotary shaft of the turbocompressor.

Another object is to provide a closed loop power system having new and improved means for controlling the flow of the liquid working fluid in the power system, so that most of the liquid working fluid is maintained in the vapor generator, while a minimum amount of working fluid is maintained in the condenser.

Another object is to provide a compressor system having new and improved means for controlling the flow of the liquid working fluid so that most of the working fluid is maintained in the evaporator of the compressor system, while a minimum amount of liquid working fluid is maintained in the condenser.

SUMMARY OF THE INVENTION

To accomplish these and other objects, the present invention preferably provides a turbocompressor heat pump system, comprising a turbocompressor including a compressor turbine and a power turbine for driving the compressor turbine, a power system connected to the power turbine and including a first working fluid and means for causing expansion of the first working fluid in the power turbine to drive the power turbine, a heat pump system connected to the compressor turbine and including a second working fluid and means for causing the compressor turbine to compress the second working fluid, the second working fluid including a lubricant while the first working fluid is desirably free of any lubricant, the power turbine and the compressor turbine respectively including a power turbine rotor and a compressor turbine rotor together with a common supporting shaft for rotatably supporting such rotors, bearing means for rotatably supporting the shaft, and bearing cooling and lubricating means for circulating the second working fluid and the intermixed lubricant through the bearing means to cool and lubricate the bearing means, the bearing cooling and lubricating means including supply means for supplying the second working fluid and the intermixed lubricant from the heat pump system to the bearing means, and return means for returning the second working fluid and the intermixed lubricant from the bearing means to the heat pump system.

The supply means may include a pump for developing pumping pressure to circulate the second working fluid and the intermixed lubricant through the bearing means. An expansion valve may be provided, through which the second working fluid passes in travelling from the heat pump system to the bearing means. The expansion valve may include theremostatic control means for sensing the temperature of the second working fluid in the return means and for opening the expansion valve as a function of such temperature. The supply means may also include an accumulator for stabilizing the pressure of the second working fluid.

The supply means may include a bypass valve connected around the pump for bypassing some of the working fluid pumped by the pump. The supply means may also include means for supplying heat to the second working fluid to promote the vaporization of the working fluid as it passes through the bearing means.

The bearing means may include at least a first bearing supporting the shaft near the power turbine rotor and a second bearing supporting the shaft near the compressor turbine rotor. The supply means may be connected to the space between the first and second bearing means for supplying the second working fluid with the lubricant to such space for passage through the bearings. The bearing means may include a shaft seal around the shaft between the power turbine rotor and the first bearing. The return means may be connected to the space between the shaft seal and the first bearing, whereby the second working fluid and the lubricant pass through such space into the return means after passing through the first bearing. In this way, the shaft seal and the return means are effective to avoid leakage of the second working fluid and the lubricant into the power turbine.

The return means may also be connected to an additional space between the second bearing and the compressor turbine rotor for withdrawing the second working fluid and the lubricant from such additional space after they pass through the second bearing.

The present invention may also provide a Rankine cycle power turbine system for driving a heat pump compressor turbine or the like, comprising a power turbine, a closed power loop connected to the power turbine and including a readily vaporizable organic working fluid for expansion in the power turbine to drive such turbine, such turbine having a pressure inlet and an exhaust outlet, the power loop including a condenser for receiving vaporized working fluid from the exhaust outlet of the turbine and for cooling and liquefying the working fluid, a vapor generator for receiving the liquid working fluid and including heat supply means for supplying heat to the working fluid to generate working fluid vapor to operate the turbine, a pump for pumping liquid working fluid between the condenser and the vapor generator, vapor conduit means for carrying fluid vapor between the vapor generator and the pressure inlet of the turbine to drive the turbine, the pump having an inlet connected to the condenser and a pressure outlet connected to the vapor generator, bypass conduit means connected between the pressure outlet of the pump and the condenser for returning liquid working fluid to the condenser from the pump, the bypass conduit means including a selectively operable valve, and level control means connected to the bypass valve for opening and closing such valve to maintain a limited liquid working fluid level in the condenser whereby liquid working fluid is always supplied to the inlet of the pump while the supply of liquid working fluid in the condenser is limited so that an adequate supply of the liquid working fluid is maintained in the vapor generator.

The level control means may include a float responsive to the liquid working fluid level in the condenser, and means operable by the float for opening and closing the bypass valve for maintaining the liquid working fluid between upper and lower levels in the condenser. More specifically, the level control means may include means including electrical switching means operable by the float and electrical operating means connected to such switching means for operating the bypass valve to maintain the liquid working fluid level between upper and lower levels in the condenser.

The vapor control means may include a selectively operable vapor control valve for regulating the flow of working fluid vapor to the power turbine. The heat supply means may include means for receiving solar heat and means for transferring such solar heat to the vapor generator.

The present invention may also provide a heat pump system, comprising a heat pump compressor, a closed heat pump loop connected to the compressor and including a readily vaporizable organic working fluid for compression in the compressor, the compressor having a low pressure inlet and a high pressure outlet, the loop including a condenser for receiving compressed working fluid from the outlet of the compressor and for cooling the working fluid to liquefy it, an evaporator for receiving the liquid working fluid and for causing the working fluid to evaporate to produce working fluid vapor, vapor conduit means for carrying working fluid vapor between the evaporator and the inlet of the compressor for compression therein, a variable expansion valve connected between the condenser and the evaporator for conducting the liquid working fluid therebetween, and liquid level control means responsive to the working fluid level in the condenser for regulating the expansion valve to maintain a minimum liquid working fluid level in the condenser so that only liquid working fluid is supplied to the expansion valve while most of the liquid working fluid is maintained in the evaporator.

The liquid working fluid level control means may comprise a float responsive to the liquid level in the condenser for opening and closing the expansion valve to maintain the minimum liquid level in the condenser. Mechanical means may be connected between the float and the expansion valve for opening and closing the valve.

The condenser may include cooling means for removing heat therefrom, while the evaporator may include heat exchange means for supplying heat thereto.

The system may include a surge bypass valve for bypassing some of the compressed working fluid between the high pressure outlet and the low pressure inlet of the compressor to avoid surge conditions in the compressor. The compressor may take the form of a compressor turbine.

BRIEF DESCRIPTION OF THE DRAWINGS

Further objects, advantages and features of the present invention will appear from the following description, taken with the accompanying drawings, in which.

DETAILED DESCRIPTION OF ILLUSTRATIVE EMBODIMENT

Figure 1:
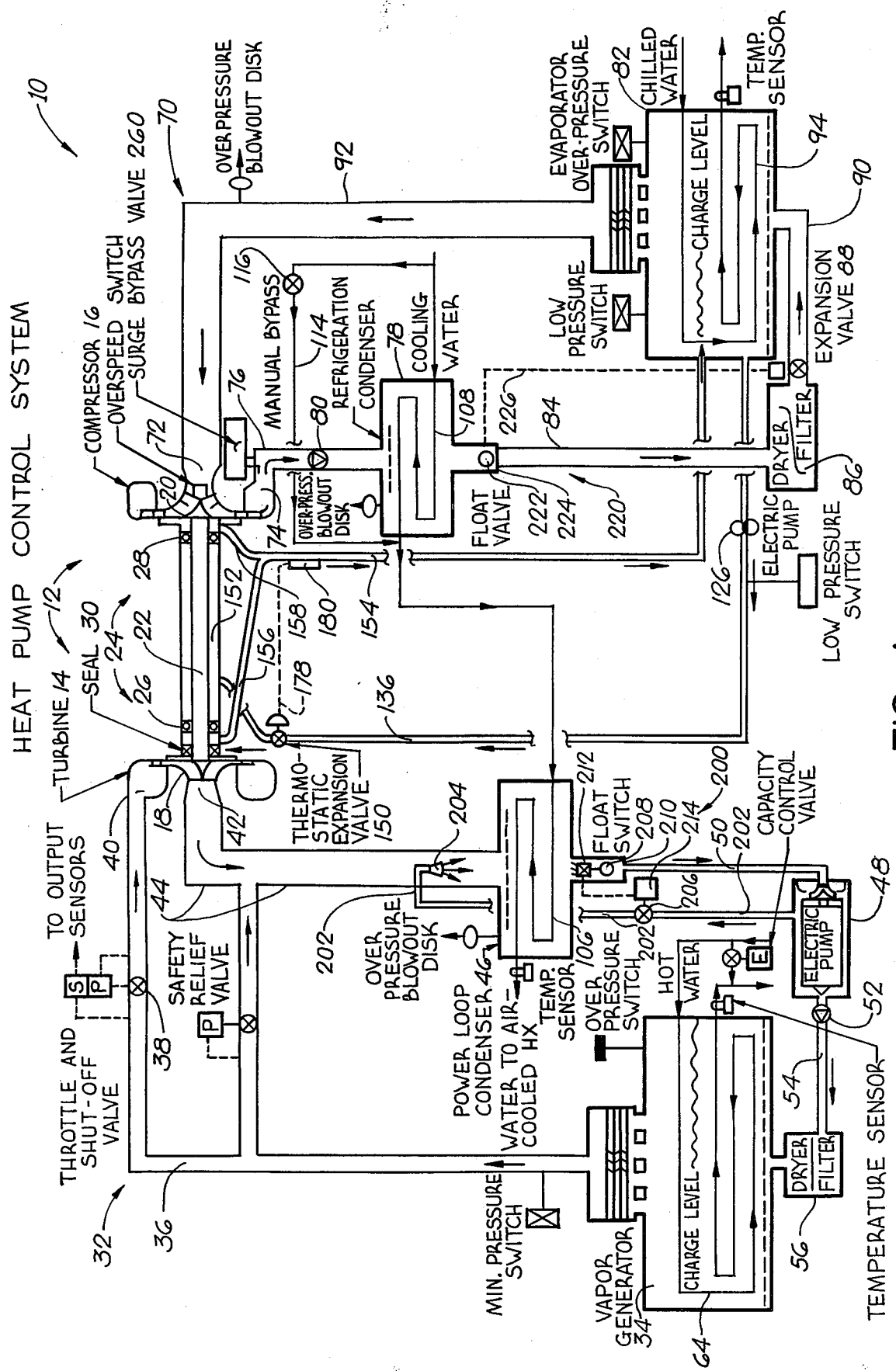
FIG. 1 is a diagrammatic representation of a solar-powered turbocompressor heat pump system to be described as an illustrative embodiment of the present invention.
Figure 2:
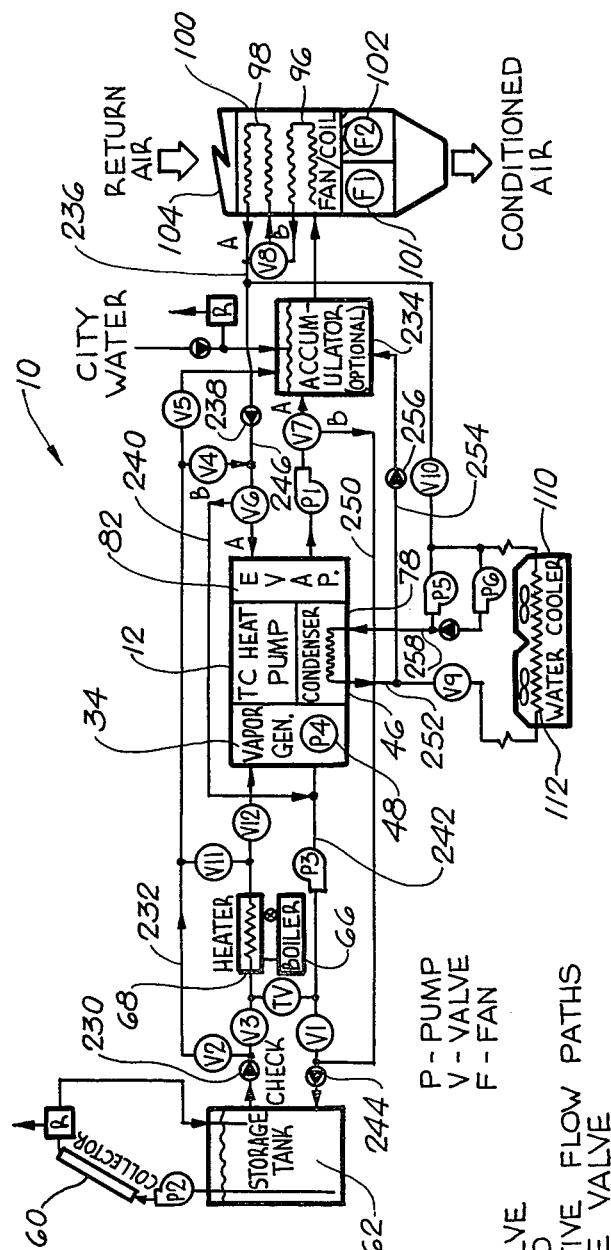
FIG. 2 is a schematic diagram of the solar-powered heat pump system of FIG. 1, with a table showing the setting or operating status of various components, such as valves, pumps, the furnace and fans, for the various operating modes of the system.

Referring initially to FIGS. 1 and 2, the drawings illustrate an illustrative embodiment of the present invention, in the form of a solar-powered turbocompressor heat pump system 10, preferably utilizing a turbocompressor unit 12 incorporating a power turbine 14 and a compressor turbine 16. The turbines 14 and 16 include rotors 18 and 20 which are mounted on the opposite ends of a common shaft 22, supported by bearing means 24 which may include two spaced bearings 26 and 28, preferably ball bearings or other antifriction bearings. The bearings 26 and 28 provide rotary support for the shaft 22, near the power turbine rotor 18 and the compressor rotor 20, respectively. A seal 30 is provided around the shaft 22, near the turbine rotor 18. The seal 30 may be of a face-seal type or any other known or suitable construction.

Generally, the power turbine 14 utilizes a Rankine or other power cycle, in which a readily vaporizable working fluid is circulated around a closed power loop 32 which includes the turbine 14. The working fluid may be a readily vaporizable organic fluid, such as any of various Freon fluorinated hydrocarbons commonly used as working fluids in refrigeration systems. It has been found that a fluorinated hydrocarbon known as Freon Type R11 is particularly advantageous.

The closed power loop 32 includes a vapor generator 34, to which the working fluid is supplied as a liquid, and in which the liquid is vaporized, by solar heat and in some cases supplemental heat, to produce hot high pressure vapor of the working fluid. The vapor is supplied to the power turbine 14 through a vapor conduit 36 which includes a vapor flow control valve 38, serving as a throttle and shutoff valve. The conduit 36 extends between the vapor generator 34 and the pressure inlet 40 of the power turbine 14.

The hot high pressure vapor of the working fluid is expanded in the power turbine 14 and is effective to drive the turbine rotor 18. The vapor is expanded to a lower pressure and a lower temperature and is discharged from the turbine 18 through an exhaust outlet 42 which is connected by a conduit 44 to a power loop condenser 46. In the condenser 46, the expanded vapor is cooled and liquefied to produce liquid working fluid which is returned to the evaporator 34, preferably by means of a feed pump 48 which may be electrically operated. The liquid is carried from the condenser 46 to the inlet of the pump 48 by a conduit 50. From the presure outlet of the pump 48, the liquid is carried to the vapor generator 34 along a path which includes a check valve 52, a conduit 54, and a combination drier and filter 56. The pump 48 generates sufficient pressure to overcome the pressure differential which generally exists between the vapor generator 34 and the condenser 46.

As shown in FIG. 2, solar heat may be supplied to the vapor generator 34. To capture such heat, the system 10 includes a solar collector 60, through which a heat exchange fluid such as water may be circulated. A storage tank 62 is provided to store the heated water. The hot water from the solar storage tank 62 may be circulated through a heat exchange coil 64 in the vapor generator 34. The system for circulating the hot water will be described in greater detail presently. When solar heat is not sufficient to operate the system, supplemental heat may be supplied by a furnace or boiler 66, to which a heat exchanger 68 is connected, to supply hot water to the vapor generator 34.

The preceding general description of the closed power loop system 32 will be supplemented with additional details presently.

The heat pump compressor 16 is employed to compress a readily vaporizable working fluid in a closed compressor loop 70 as shown in FIG. 1. Again, the working fluid may be a readily vaporizable organic fluid, such as any of the available FREON fluorinated hydrocarbons commonly used as working fluids in refrigeration systems. The fluorinated hydrocarbon known as Freon Type R11 has been found to be particularly advantageous. It has been found that it is advantageous to employ the same basic working fluid in both the power loop 32 and the compressor loop 70.

In the compressor loop 70, the working fluid is received by the compressor 16 at its inlet 72 in the form of a vapor at a low pressure and a low temperature. The vapor is compressed by the compressor 16 and is discharged at a higher pressure and a higher temperature at the outlet 74 of the compressor 16. A conduit 76 then carries the compressed vapor to a refrigeration condenser 78, in which the high pressure vapor of the working fluid is cooled and liquefied. The conduit 76 may include a check valve 80 to prevent reverse flow of the vapor.

From the condenser 78, the liquid working fluid is carried to an evaporator 82 along a path which includes a conduit 84, a combination drier and filter 86, an expansion valve 88, and a further conduit 90.

In the evaporator 82, the liquid working fluid is vaporized at a low pressure to produce refrigeration. The vapor is carried from the evaporator 82 to the inlet 72 of the compressor 16 by a conduit 92.

The evaporator 82 contains a heat exchange coil 94, through which a heat exchange fluid, such as water or brine, is circulated, so that the heat exchange fluid is cooled or chilled by the refrigeration in the evaporator 82.

The chilled water or other heat exchange fluid may be employed to cool a building or the like. As shown in FIG. 2, the chilled water may be circulated through one or more fan coils 96 and 98 in a heat exchanger 100, in which air is caused to flow past the coils 96 and 98 by one or more fans 101 and 102. The cooled or conditioned air from the heat exchanger 100 may be conducted to one or more rooms of a building to cool the building. The return air from such rooms may be conducted to the inlet 104 of the heat exchanger 100 for another cycle of cooling. The heat exchanger 100 may also be employed to heat the building, as will be described in greater detail presently.

As shown in FIG. 1, the power loop condenser 46 may include a heat exchange coil 106, through which a heat exchange fluid, such as water, may be circulated to remove heat from the condenser 46. Similarly, the refrigeration condenser 78 may have a heat exchange coil 108 through which water or some other heat exchange fluid may be circulated to remove heat from the condenser 78. The heat picked up by the coils 106 and 108 may be employed to heat a building when the heat pump system 10 is operated in a heating mode. For the cooling modes, the system 10 is provided with an air cooled heat exchanger 110 having one or more coils 112 through which the water from the coils 106 and 108 may be circulated. A bypass conduit 114 including a manually operable bypass control valve 160 may be connected around the coil 108 to bypass a controlled portion of the water circulated through the coils 106 and 108.

In accordance with one feature of the present invention, it is advantageous to employ some of the working fluid from the compressor loop 70 to cool the bearing means 24 for the turbocompressor 12. The working fluid is vaporized in the bearing means 24 to produce a refrigerating effect.

In addition, it is advantageous to mix a lubricant, such as lubricating oil, with the working fluid in the compressor loop 70, so that lubrication of the bearing means 24 is also produced when the working fluid is supplied to the bearing means.

Figure 4:
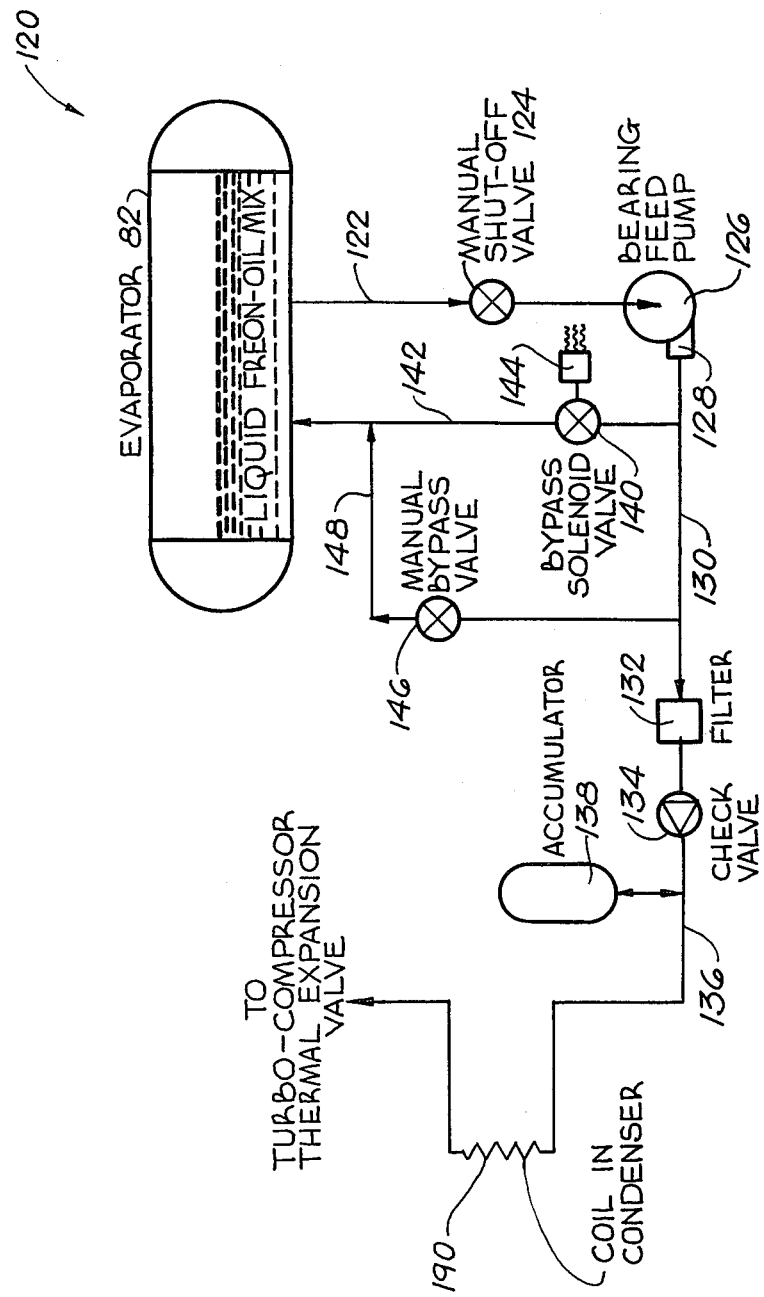
FIG. 4 is a schematic diagram showing additional details of the system for cooling and lubricating the bearings.

The working fluid to cool the bearing means 24 is preferably derived from the refrigeration evaporator 82 and is withdrawn from the evaporator through a conduit 122 which may include a manually operable shut-off valve 124, as shown in FIG. 4. A pump 126 is preferably employed to develop pressure to feed the working fluid to the bearing means 24. From the pressure outlet 128 of the pump 126, the working fluid is conducted to the bearing means 24 along a path which includes a conduit 130, a filter 132, a check valve 134, and a further conduit 136. Such path may communicate with an accumulator 138 for stabilizing the working fluid pressure, supplied to the bearing means. As shown in FIG. 4, the accumulator 138 is connected to the conduit 136.

It is preferred to provide a solenoid operated bypass valve 140 connected into a bypass conduit 142 extending from the pressure outlet 128 of the pump 126, back to the refrigeration evaporator 82. The valve 140 may be opened and closed by its solenoid 144, for selectively controlling the bypassing of at least some of the working fluid delivered by the pump 126. A manually operable bypass valve 146 may also be provided in another bypass conduit 148, extending from the pressure outlet 128 of the pump 126, back to the refrigeration evaporator 82. The valve 146 may be adjusted to bypass a controlled amount of the working fluid delivered by the pump 126, to regulate the pump pressure.

Figure 3:
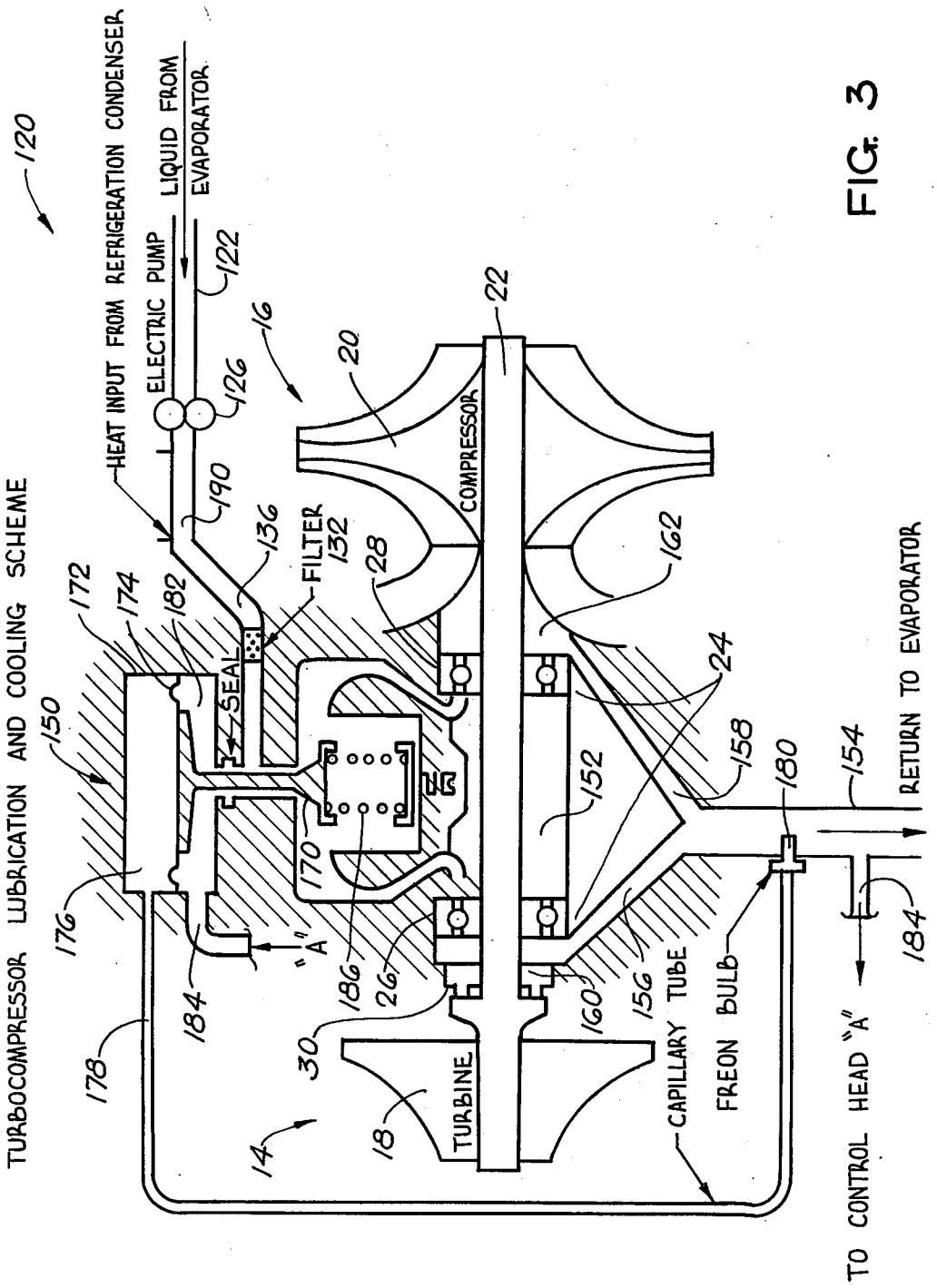
FIG. 3 is a diagrammatic representation of the turbocompressor unit, showing details of the bearings and the system for cooling and lubricating the bearings.

As shown in FIGS. 1 and 3, the working fluid supplied by the pump 126 is delivered to the bearing means 24 through an expansion valve 150 which preferably is thermostatically controlled, as will be described in greater detail presently. In the bearing means 24, the working fluid from the expansion valve 150 is preferably supplied to a space 152 around the rotatable turbine shaft 22, between the bearings 26 and 28. From the space 152, the working fluid passes axially through the bearings 26 and 28 to cool the bearings. At the same time, the bearings 26 and 28 are lubricated by the lubricant which is intermixed with the working fluid.

After passing through the bearings 26 and 28, the expanded working fluid is returned to the refrigeration evaporator 82 by a return conduit 154 which preferably has two inlet branches 156 and 158 which merge into the conduit 154. The inlet branch 156 of the return conduit 154 preferably connects with a space 160 around the turbine shaft 22, between the shaft seal 30 and the bearing 26. The second inlet branch 158 preferably connects to a space 162 around the shaft 22 between the bearing 28 and the compressor turbine 16. Thus, after the working fluid passes through the bearing 26 into the space 160, the expanded fluid is withdrawn through the first branch 156 of the return conduit 154 and is returned to the refrigeration evaporator 82. The shaft seal 30 prevents any leakage of the expanded working fluid from the space 160 into the power turbine 14. Thus, the oil or other lubricant is kept out of the power turbine, so that the lubricant does not contaminate the working fluid in the power loop 32. Because of the high temperatures and pressures in the power loop 32, it is desirable to exclude any lubricant from the working fluid in the power loop. The shaft seal 30 also minimizes any leakage of working fluid from the power turbine 14 into the space 160, but any such leakage of working fluid is harmless, because the working fluid is simply returned through the conduits 156 and 154 to the refrigeration evaporator 82. As previously indicated, the working fluids in the power loop 32 and the compressor loop 70 are preferably the same, so that no contamination results from slight leakage of the power loop working fluid into the compressor loop. Generally, the working fluid pressure in the power turbine 14 always exceeds the working fluid pressure in the return conduits 156 and 154, so that any leakage through the shaft seal 30 is always between the power turbine 14 and the return conduit 156, and never in the opposite direction.

The working fluid from the central space 152 passes through the second bearing 28 into the space 162 around the shaft 22 and is returned through the branch 158 and the return conduit 154 to the refrigeration evaporator 82. Any slight leakage of working fluid between the compressor turbine 16 and the space 162 is harmless, because the same working fluid is involved, intermixed with the lubricant.

As previously indicated, the expansion valve 150, through which the working fluid is supplied to the bearing means 24, is preferably thermostatically controlled, in response to the temperature of the expanded working fluid in the return conduit 154. Thus, the expansion valve 150 is opened as a function of rising temperature in the return conduit 154. Thus, the amount of working fluid, supplied through the expansion valve 150 to the bearing means 24, is increased as needed to keep down the temperature of the expanded working fluid in the return conduit 154.

As shown in FIG. 3, the thermostatic expansion valve 150 may comprise a movable valve member 170, adapted to be operated by a fluid pressure operator 172 including a diaphragm 174. A chamber 176 on one side of the diaphragm 174 is connected by a capillary tube 178 to a temperature sensor in the form of a bulb 180. A fluid such as Freon may be provided in the closed space formed by the chamber 176, the tube 178 and the bulb 180. It will be seen that the bulb 180 senses the temperature of the expanded working fluid in the return conduit 154. On the opposite side of the diaphragm 174, there is another chamber 182 which is connected by a branch return conduit 184 to the main return conduit 154, leading to the refrigeration evaporator. As shown, the valve member 170 is biased toward its closed position by a spring 186.

The thermostatic expansion valve 150 regulates the flow of the working fluid to the bearings 26 and 28, so that the bearings are cooled sufficiently to prevent the temperature of the expanded working fluid from rising above the desired maximum temperature. The lubricant which is intermixed with the working fluid lubricates the bearings 26 and 28, so that adequate lubrication is always assured.

As shown in FIG. 4, it is advantageous to provide means 190 for adding heat to the working fluid as it passes between the bearing feed pump 126 and the bearing means 24. For example, such means 190 may take the form of a heat exchange coil in the power loop condenser 46. The coil 190 may be connected into the conduit 126 or the conduit 130. It is advantageous to supply enough heat to the working fluid so that a minor portion of the working fluid will immediately flash into vapor as the working fluid enters the bearing means 24. Such flash formation of vapor has the advantageous effect of causing the intermixed lubricating oil to be sprayed immediately throughout the bearing means, so that all portions of the bearing means are liberally supplied with lubricating oil.

In accordance with another feature of the present invention, the power loop 32 is provided with control means 200 for controlling the flow of the liquid working fluid from the power loop condenser 46 to the vapor generator 34, so that a minimum level of the liquid working fluid will be maintained in the condenser 46, while most of the liquid working fluid will be returned to the vapor generator 34. In this way, an adequate supply of the liquid working fluid will be maintained in the vapor generator 34.

As previously indicated, the liquid working fluid is returned from the condenser 46 to the vapor generator by the electrically operated pump 48, which preferably is operated continuously. It is desirable to maintain a minimum level of the liquid working fluid in the condenser 46, so that the inlet of the pump 48 will always be supplied with the liquid working fluid. To insure that most of the liquid working fluid will be maintained in the vapor generator 34, the pump 48 is capable of pumping the liquid at a faster rate than the liquid is condensed in the condenser 46. To maintain a minimum liquid level in the condenser 46, some of the liquid is returned or bypassed from the pressure outlet of the pump 48 to the condenser 46, under the selective control of the control means 200. For such purpose, a bypass or return conduit 202 is connected between the pressure outlet of the pump 48 and the condenser 46. As shown, the return conduit 202 terminates in a spray head 204 which is positioned in the vapor conduit 44 leading into the inlet of the condenser 46. Thus, the returned liquid working fluid is directed by the spray head 204 into the inlet of the condenser 46.

The control means 200 may include a selectively operable control valve 206, connected into the return conduit 202 to regulate the flow of the liquid working fluid therein. The valve 206 is adapted to be controlled by level responsive means 208, responsive to the level of the liquid working fluid in the condenser 46, such level responsive means 208 being illustrated in the form of a float which is movable vertically in a float chamber or well 210 at the lower end of the condenser 46. While the float 208 could operate the valve 206 mechanically, the float 208 is illustrated as operating a float switch 212 which controls an electrically powered operator 214 for the valve 206.

The bypass valve 206 is opened as an inverse function of the level of the float 208. Thus, as the float 208 falls, indicating a falling liquid level in the condenser 46, the valve 206 is opened to increase the amount of the liquid which is returned to the condenser 46. Conversely, as the float 208 rises, indicating a rising liquid level, the value 206 is closed to decrease the amount of liquid which is returned to the condenser 46.

More specifically, the float switch 212 may be of the reversing type, which is movable to a valve opening position, when the float 208 is too low, while being movable to a valve closing position when the float 208 is too high. The switch 212 may have a neutral or dead position between the valve opening position and the valve closing position. The valve operator 214 may be in the form of a reversible electric motor or other operating device.

When the float 208 is too low, the switch 212 is moved to its valve opening position, in which the switch energizes the operator 214 to open the recirculation control valve 206. This causes additional liquid working fluid to be recirculated by the pump 48 through the conduit 202 into the condenser 46. Accordingly, the float 208 rises, so that the switch 212 is moved to its neutral or dead position. The operator 214 is thus deenergized, so that the valve 206 holds its position. If the float 208 rises too high, the float switch 212 is moved to its valve closing position, whereupon the operator 214 is energized to begin closing the valve 206. This reduces the amount of liquid which is recirculated into the condenser 46. Accordingly, the float 208 falls to a lower level and operates the switch 212 to its neutral or dead position, so as to deenergize the operator 214, whereupon the valve 206 holds its position. Thus, by virtue of the level control means 200, the pump 48 is caused to recirculate a sufficient amount of the liquid working fluid so that the intake of the pump is always supplied with liquid. However, most of the liquid is maintained in the vapor generator 34, to insure an adequate supply of the liquid working fluid therein.

In accordance with another feature of the present invention, the compressor loop 70 is provided with level control means 220 for controlling the level of the liquid working fluid in the refrigeration condenser 78, so that a minimum level of the liquid will be maintained therein. In this way, the expansion valve 88 will always be supplied with working fluid in the liquid state. However, most of the liquid working fluid will be maintained in the evaporator 82, to insure an adequate supply of the liquid therein. The expansion valve 88 is preferably operated by the liquid control means 220, which may include a float 222 in a float chamber or well 224 at the lower end of the refrigeration condenser 78. Preferably, the float 222 operates the expansion valve 88 by means a mechanical linkage 226, indicated diagrammatically in FIG. 1. The expansion valve 88 is opened as a direct function of the level of the float 222. Thus, when the liquid working fluid rises in the well 224 at the lower end of the condenser 78, the float 222 rises and opens the expansion valve 88, so that the liquid flows at a faster rate into the evaporator 82. When the liquid level drops in the condenser 78, the float 222 drops to a lower level, so as to operate the expansion valve 88 toward its closed position, thereby decreasing the rate at which the liquid flows through the valve 88 into the evaporator 82.

Thus, by virtue of the level control means 220, the expansion valve 88 is regulated so that a minimum level of the liquid working fluid is maintained in the condenser 78, whereby working fluid in the liquid state is always supplied to the expansion valve 88. However, most of the liquid is maintained in the evaporator 82, to insure an adequate supply of the liquid therein.

FIG. 2 is a diagrammatic illustration of various control components which are employed to switch the turbocompressor heat pump system 10 to any of the following six different modes:
 1. Direct solar heating.
 2. Solar assisted heat pump.
 3. Furnace heating.
 4. Solar cooling.
 5. Furnace cooling.
 6. Idle.

FIG. 2 includes a table which shows the settings of the various control components to achieve each of the six different modes. The control components of FIG. 2 include numerous valves and pumps which control the flow of water, or some other heat exchange liquid, through the various heat exchange coils and other components in the system 10.

A pump P2 is provided to circulate water from the solar storage tank 62 through the solar collector 60, and then back to the storage tank 62. The pump P2 may be thermostatically cycled in response to the temperature of the water in the solar collector 60, so that the pump P2 is operated when the temperature of the water in the solar collector exceeds the control point, due to the collection of solar heat.

For the direct solar heating mode, hot water from the solar storage tank 62 flows through a check valve 230, a valve V2, a conduit 232, and a valve V5 to an accumulator or storage tank 234. From the accumulator 234, the water flows through the fan coil 96, a three-way valve V8, optionally through the fan coil 98, a conduit 236, a check valve 238, a three-way valve V6, a conduit 240, a conduit 242, a pump P3, a valve V1, and a check valve 244, back to the storage tank 62. The pump P3 is operated to circulate the solar heated water. The turbo-compressor unit 12 is shut down for direct solar heating. A valve V4 may be opened and closed for selectively bypassing the solar heated water between the conduit 232 and the conduit 246, before the solar heated water is supplied to the accumulator 234 and the fan coils 96 and 98. For maximum heating, both fans 101 (F1) and 102 (F2) are operated, and the valve V8 is adjusted to direct the solar heated water through the fan coil 98, as well as the fan coil 96.

For the solar assisted heat pump mode, the turbocompressor 12 and the furnace or boiler 66 are operated. Both fans F1 and F2 are operated. The solar heated water from the solar storage tank 62 is directed through the coil 94 in the heat pump evaporator 82, to supply heat to the working fluid therein. The water heated by the furnace or boiler 66 is circulated through the coil 64 in the vapor generator 34 of the power loop 32, to produce hot high pressure working fluid vapor to drive the power turbine 14. The hot water from the condensers 46 and 78 is circulated through the fan coils 96 and 98 to heat the building.

More specifically, for the solar assisted heat pump mode, the hot water from the solar storage tank 62 is circulated through the check valve 230, the valve V2, the conduit 232, the valve V5, the three-way valve V6, the coil 94 in the evaporator 82, the pump P1, the three-way valve V7, the conduit 250, and the check valve 244, back to the storage tank 62. The pump P1 is operated to circulate the solar heated water.

In the solar assisted heat pump mode, the water heated in the heat exchanger 68 of the furnace 66 is circulated through the valve V12, the coil 64 in the vapor generator 48, the conduit 242, the pump P3, and the throttle valve TV back to the heat exchanger 68. The pump P3 is operated to circulate the water.

In the solar assisted heat pump mode, water to heat the building is circulated through the coils 106 and 108 in the power loop condenser 46 and the heat pump condenser 78, where the water is heated. The water flows along a conduit 255, a conduit 254, and a check valve 256 to the accumulator or storage tank 234, from which the hot water circulates through the fan coil 96, the three-way valve V8, the fan coil 98, the conduit 236, a valve V10, a pump P5, and a conduit 258, back to the condensers 46 and 78. The pump P5 is operated to circulate the water.

The furnace heating mode is employed when there is insufficient solar heat to supply the heat needed by the heat pump evaporator 82. For this mode, the turbocompressor 12 is shut down. The water heated by the furnace 66 is circulated directly through the fan coils 96 and 98 to heat the building. Both fans F1 and F2 are operated.

For the furnace heating mode, the hot water from the furnace heat exchanger 68 is circulated through the valve V11 and the valve V5 to the accumulator or storage tank 234, from which the hot water is circulated through the fan coil 96, the three-way valve V8, the conduit 236, the check valve 238, the conduit 246, the three-way valve V6, the conduit 240, the conduit 242, the pump P3, and the throttle valve TV, back to the heat exchanger 68. The water is circulated by the pump P3.

For the solar cooling mode, the solar heated water is circulated through the vapor generator 34 to produce hot high pressure working fluid to drive the power turbine 14. The refrigeration evaporator 82 produces chilled water which is circulated through the fan coil 96 to cool the building. The first fan F1 is operated. Water to cool the condensers 46 and 78 is circulated by the pump P5 through the heat exchange coil 112 of the air cooled heat exchanger 110. The furnace 66 is not used.

More specifically, in the solar cooling mode, the solar heated water from the storage tank 62 is circulated through the check valve 230, the valve V2, the valve V11, the valve V12, the vapor generator 34, the conduit 242, the pump P3, the valve V1, and the check valve 244, back to the storage tank 62. The pump P3 circulates the water.

In the solar cooling mode, the chilled water from the evaporator 82 is circulated by the pump P1 through the three-way valve V7 to the accumulator or storage tank 234, from which the chilled water is circulated through the fan coil 96, the three-way valve V8, the conduit 236, the check valve 238, and the three-way valve V6, back to the evaporator 82.

For the solar cooling mode, the pump P5 circulates cooling water from the coil 112 of the heat exchanger 110 through the conduit 258, the condensers 46 and 78, and the valve V9, back to the coil 112.

The furnace cooling mode is employed when solar heat is insufficient. The furnace 66 is operated to heat water which is circulated through the vapor generator 34 to produce hot high pressure vapor which drives the power turbine 14. The chilled water produced by the evaporator 82 is circulated through the fan coil 96 to cool the building. The pump 5 circulates cooling water from the air cooled heat exchanger 110 to cool the condensers 46 and 78.

More specifically, in the furnace cooling mode, the hot water from the furnace heat exchanger 68 is circulated through the valve V12, the vapor generator 34, the conduit 242, the pump P3, and the throttle valve TV, back to the heat exchanger 68. The pump P3 circulates the water. The solar heated water in the storage tank 62 is not used. Otherwise, the furnace cooling mode is the same as the solar cooling mode.

In the idle mode, all of the pumps and fans are shut down, except for the first fan F1, which is operated to provide ventilation in the building, and the pump P2, which is cycled to circulate water through the solar collector 60, so that the solar heated water will be accumulated in the storage tank 62. The turbo-compressor 12 is shut down.

The bearing lubrication and cooling system of the present invention, as exemplified by FIGS. 3 and 4, makes it possible to provide adequate lubrication and cooling of the bearing means 24 while preventing any leakage of the lubricant into the working fluid employed in the power loop 32 for the power turbine 14. By thus eliminating any contamination of the working fluid in the power loop, it is possible to employ extremely high working fluid pressures and temperatures in the power loop, so as to achieve high efficiency.

Moreover, extremely high cooling capacity and heat pumping capacity can be achieved. It is advantageous to employ the same working fluid in both the power loop and the compressor loop 70. With the same working fluid, it is possible to tolerate a small amount of leakage between the power loop 32 and the compressor loop 70, through the seals in the turbocompressor 12, so that it is not necessary to impose extremely severe sealing restrictions. Thus, the drag and power loss in the seals can be minimal. The overall system, comprising the turbocompressor 12, the power loop 32 and the compressor loop 70 is hermetically sealed, so that there is no leakage of the working fluid in the atmosphere.

As shown in FIG. 1, a surge bypass valve 260 is preferably connected between the high pressure outlet 74 and the low pressure inlet 72 of the pressure turbine 16, to bypass the high pressure working fluid from the outlet 74 back to the inlet 72. The surge bypass valve 260 avoids operating the compressor turbine 16 under harmful surge conditions. The valve 260 may be pressure responsive, adapted to open progressively to relieve excess pressure at the outlet 74 of the turbine 16. If desired, the surge bypass valve 260 may also include a manually operable bypass valve, which may be opened as needed.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A turbocompressor heat pump system, comprising a turbocompressor including a compressor turbine and a power turbine for driving said compressor turbine, a power system connected to said power turbine and including a first working fluid and means for causing expansion of said first working fluid in said power turbine to drive said power turbine, a heat pump system connected to said compressor turbine and including a second working fluid and means for causing said compressor turbine to compress said second working fluid, said second working fluid including a lubricant mixed therewith while said first working fluid is substantially free of any lubricant, said power turbine and said compressor turbine respectively including a power turbine rotor and a compressor turbine rotor together with a common supporting shaft for rotatabley supporting said rotors, bearing means for rotatably supporting said shaft, a shaft seal around said shaft between said power turbine rotor and said bearing means, and bearing cooling and lubricating means for circulating said second working fluid and said intermixed lubricant through said bearing means to cool and lubricate said bearing means, said bearing cooling and lubricating means including supply means for supplying said second working fluid and said intermixed lubricant from said heat pump system to said bearing means, and return means for returning said second working fluid and said intermixed lubricant from said bearing means to said heat pump system, said shaft seal and said bearing cooling and lubricating means being constructed to prevent said second working fluid and said intermixed lubricant from mixing with said first working fluid.

2. A system according to claim 1, in which said supply means includes a pump for developing pumping pressure to circulate said second working fluid and said intermixed lubricant through said bearing means.

3. A system according to claim 1, in which
said supply means includes an expansion valve through which said second working fluid passes in travelling from said heat pump system to said bearing means.

4. A system according to claim 1, in which
said supply means includes a pump for developing pumping pressure to circulate said second working fluid through said bearing means,
and an expansion valve through which said second working fluid passes in travelling between said pump and said bearing means.

5. A system according to claim 3, in which
said expansion valve includes thermostatic control means for sensing the temperature of said second working fluid in said return means and for opening said expansion valve as a function of such temperature.

6. A system according to claim 4, in which
said expansion valve includes thermostatic control means for sensing the temperature of said second working fluid in said return means and for opening said expansion valve as a function of such temperature.

7. A system according to claim 1, in which
said supply means includes an accumulator for stabilizing the pressure of said second working fluid as it travels from said heat pump system to said bearing means.

8. A system according to claim 2, in which
said supply means includes an accumulator for stabilizing the pumping pressure produced by said pump.

9. A system according to claim 4, in which said supply means includes an accumulator for stabilizing the pumping pressure produced by said pump.

10. A system according to claim 2, including a bypass valve connected around said pump for bypassing at least some of the working fluid pumped by said pump.

11. A system according to claim 4, including a bypass valve connected around said pump for bypassing at least some of the working fluid pumped by said pump.

12. A system according to claim 2, in which said supply means includes means for supplying heat to said second working fluid as it passes between said pump and said bearing means to promote the vaporization of said working fluid as it passes through said bearing means.

13. A system according to claim 1, in which said bearing means includes at least a first bearing supporting said shaft near said power turbine rotor and a second bearing supporting said shaft near said compressor turbine rotor, said bearing means including means forming a first space around said shaft between said first and second bearings, said supply means being connected to said space for supplying said second working fluid with said lubricant thereto for passage through said first and second bearings, said shaft seal around said shaft being between said power turbine rotor and said first bearing, said bearing means including means forming a second space around said shaft between said shaft seal and said first bearing, said return means being connected to said second space whereby said second working fluid and lubricant pass through said second space into said return means after passing through said first bearing, said shaft seal and said return means being effective to avoid leakage of said second working fluid and lubricant into said power turbine.

14. A system according to claim 13, in which said supply means includes a pump for developing pumping pressure to circulate said second working fluid and lubricant through said bearing means.

15. A system according to claim 14, said supply means including an expansion valve through which said second working fluid passes in travelling between said pump and said bearing means.

16. A system according to claim 13, said bearing means including means forming a third space around said shaft between said second bearing and said compressor turbine rotor, said return means also being connected to said third space for withdrawing said second working fluid and lubricant therefrom after they pass through said second bearing.

17. A Rankine cycle power turbine system for driving a heat pump compressor turbine or the like, comprising a power turbine, a closed power loop connected to said power turbine and including a readily vaporizable organic working fluid for expansion in said turbine to drive said turbine, said turbine having a pressure inlet and an exhaust outlet, said power loop including a condenser for receiving vaporized working fluid from said exhaust outlet of said turbine and for cooling said vaporized working fluid to liquefy said working fluid, a vapor generator for receiving the liquid working fluid and including heat supply means for supplying heat to said working fluid to generate working fluid vapor to operate said turbine, a pump for pumping liquid working fluid between said condenser and said vapor generator, vapor conduit means for carrying working fluid vapor between said vapor generator and said pressure inlet of said turbine to drive said turbine, said pump having an inlet connected to said condenser and a pressure outlet connected to said vapor generator, bypass conduit means connected between said pressure outlet of said pump and said condenser for returning liquid working fluid to said condenser from said pump, said bypass conduit means including a selectively operable valve, and level control means connected to said bypass vlave for opening and closing said valve to maintain a limited liquid working fluid level in said condenser whereby liquid working fluid is always supplied to the inlet of said pump while the supply of liquid working fluid in said condenser is limited so that an adequate supply of the liquid working fluid is maintained in said vapor generator.

18. A system according to claim 17, in which
said level control means include a float responsive to the liquid working fluid level in said condenser,
and means operable by said float for opening and closing said bypass valve for maintaining the liquid working fluid between upper and lower levels in said condenser.

19. A system according to claim 17, in which
said level control means includes a float responsive to the level of the liquid working fluid in said condenser,
and means including electrical switching means operable by said float and electrical operating means connected to said switching means for operating said bypass valve to maintain the liquid working fluid level between upper and lower levels in said condenser.

20. A system according to claim 17, in which
said level control means includes a float responsive to the level of the liquid working fluid in said condenser,
electrical operating means for operating said bypass valve,
and electrical switching means operable by said float for controlling said electrically operable operating means to open said bypass valve when the liquid level in said condenser drops to an undesirably low level while closing said bypass valve when said liquid level rises to an undesirably high level.

21. A system according to claim 17, in which
said vapor conduit means includes a selectively operable vapor control valve for regulating the flow of working fluid vapor to said turbine.

22. A system according to claim 17, in which said vapor conduit means includes a selectively operable throttling valve for regulating the flow of working fluid vapor to said turbine.

23. A system according to claim 17, in which said heat supply means includes means for receiving solar heat and means for transferring such solar heat to said vapor generator.

24. A heat pump system, comprising a heat pump compressor rotatably supported via bearing means, a closed heat pump loop connected to said compressor and including a readily vaporizable organic working fluid for compression in said compressor, said compressor having a low pressure inlet and a high pressure outlet, said loop including a condensor for receiving compressed working fluid from said outlet of said compressor and for cooling said working fluid to liquefy said working fluid, an evaporator for receiving the liquid working fluid and for causing said working fluid to evaporate to produce working fluid vapor, bearing cooling and lubricating means for circulating liquid working fluid from said evaporator through said bearing means, vapor conduit means for carrying working fluid vapor between said evaporator and said inlet of said compressor for compression therein, a variable expansion valve connected between said condenser and said evaporator for conducting the liquid working fluid therebetween, and liquid level control means responsive to the working fluid liquid level in said condenser for regulating said expansion valve to maintain a minimum liquid working fluid level in said condenser so that only liquid working fluid is supplied to said expansion valve while most of the liquid working fluid is maintained in said evaporator.

25. A system according to claim 24, said liquid working fluid level control means comprising a float responsive to the liquid level in said condenser for opening and closing said expansion valve to maintain the minimum liquid level in said condenser.

26. A system according to claim 24, said liquid working fluid level control means including a float responsive to the liquid level in said condenser,
and mechanical means connecting said float to said expansion valve for opening and closing said expansion valve to maintain the minimum liquid level in said condenser.

27. A system according to claim 24,
said liquid working fluid level control means including a float moveably received in a lower portion of said condenser and responsive to the liquid level therein, and mechanical means connecting said float to said expansion valve for opening and closing said valve to maintain the minimum liquid level in said condenser.

28. A system according to claim 24, in which
said condenser includes cooling means for removing heat therefrom,
said evaporator including heat exchange means for supplying heat thereto.

29. A system according to claim 24, including a surge bypass valve for bypassing some of the compressed working fluid between said high pressure outlet and said low pressure inlet of said compressor to avoid surge conditions in said compressor.

30. A system according to claim 24, in which said compressor takes the form of a compressor turbine, and wherein said bearing cooling and lubricating means circulates said liquid working fluid between said evaporator and said compressor turbine.

* * * * *